(12) United States Patent
Kletter

(10) Patent No.: US 6,975,331 B2
(45) Date of Patent: Dec. 13, 2005

(54) METHOD AND SYSTEM FOR EFFICIENT INTERPOLATION USING PROGRAMMABLE NODE SPACING

(75) Inventor: Doron Kletter, San Mateo, CA (US)

(73) Assignee: Xerox Corporation, Stamford, CT (US)

(*) Notice: Subject to any disclaimer, the term of this patent is extended or adjusted under 35 U.S.C. 154(b) by 706 days.

(21) Appl. No.: 10/134,236

(22) Filed: Apr. 26, 2002

(65) Prior Publication Data

US 2003/0201997 A1 Oct. 30, 2003

(51) Int. Cl.[7] .............................................. G09G 5/02
(52) U.S. Cl. ...................... 345/604; 345/606; 345/600; 345/601; 345/602
(58) Field of Search ................................ 345/604, 606, 345/600, 601, 602

(56) References Cited

U.S. PATENT DOCUMENTS

2002/0122207 A1 * 9/2002 Klassen et al. .............. 358/2.1

* cited by examiner

*Primary Examiner*—Matthew C. Bella
*Assistant Examiner*—Tam Tran
(74) *Attorney, Agent, or Firm*—Phuong-Quan Hoang; E. O. Palazzo

(57) ABSTRACT

A method and a system for computing the function value of an input node based on function values of known nodes. A database of known nodes and their corresponding function values is formed. The known nodes are located such that a distance between any two adjacent known nodes is an integer power-of-two number. The database is searched for a first node such that the input node is located between the first node and an adjacent second node. The difference δ between the input node and the first node is computed. Then δ is shifted to the right by k positions, k being the logarithm in base 2 of the distance between the first and second nodes. The input node function value is computed by combining the first node function value with the product of the shifted δ and the difference between the function values of the second and first nodes.

19 Claims, 7 Drawing Sheets

FIG. 1 (PRIOR ART)

STEP 1 ○—▶●
STEP 2 △—▶△
STEP 3 ▶—·—▶◀

| nodeIndex | nodeValue | exponent |
|---|---|---|
| 0 | *0 | 2 |
| 1 | 4 | 2 |
| 2 | 8 | 3 |
| 3 | 16 | 4 |
| 4 | 32 | 4 |
| 5 | 48 | 4 |
| 6 | 64 | 4 |
| 7 | 80 | 4 |
| 8 | 96 | 4 |
| 9 | 112 | 4 |
| 10 | 128 | 4 |
| 11 | 144 | 4 |
| 12 | 160 | 4 |
| 13 | 176 | 4 |
| 14 | 192 | 5 |
| 15 | 224 | 5 |
| 16 | 255 | |

FIG. 6

| nodeIndex | nodeValue | exponent |
|---|---|---|
| 0 | *0 | |
| 1 | 16 | 4 |
| 2 | 32 | 4 |
| 3 | 64 | 5 |
| 4 | 128 | 6 |
| 5 | 192 | 6 |
| 6 | 256 | 6 |
| 7 | 320 | 6 |
| 8 | 384 | 6 |
| 9 | 448 | 6 |
| 10 | 512 | 6 |
| 11 | 576 | 6 |
| 12 | 640 | 6 |
| 13 | 704 | 6 |
| 14 | 768 | 6 |
| 15 | 896 | 7 |
| 16 | 1023 | 7 |

FIG. 7

Origin @ 128 for a and b

| nodeIndex | nodeValue | exponent |
|---|---|---|
| 0 | 0 | 5 |
| 1 | 32 | 5 |
| 2 | 64 | 4 |
| 3 | 80 | 4 |
| 4 | 96 | 4 |
| 5 | 112 | 3 |
| 6 | 120 | 2 |
| 7 | 124 | 2 |
| 8 | *128 | 2 |
| 9 | 132 | 2 |
| 10 | 136 | 3 |
| 11 | 144 | 4 |
| 12 | 160 | 4 |
| 13 | 176 | 4 |
| 14 | 192 | 5 |
| 15 | 224 | 5 |
| 16 | 255 | |

FIG. 8

Origin @ 96 for FAX b

| nodeIndex | nodeValue | exponent |
|---|---|---|
| 0 | 0 | 5 |
| 1 | 32 | 4 |
| 2 | 48 | 4 |
| 3 | 64 | 4 |
| 4 | 80 | 3 |
| 5 | 88 | 2 |
| 6 | 92 | 2 |
| 7 | *96 | 2 |
| 8 | 100 | 2 |
| 9 | 104 | 3 |
| 10 | 112 | 4 |
| 11 | 128 | 4 |
| 12 | 144 | 5 |
| 13 | 176 | 5 |
| 14 | 192 | 5 |
| 15 | 224 | 5 |
| 16 | 255 | |

METHOD AND SYSTEM FOR EFFICIENT INTERPOLATION USING PROGRAMMABLE NODE SPACING

BACKGROUND OF THE INVENTION

1. Field of the Invention

The present invention relates generally to methods and systems for computing the function value of a point using interpolation on known or measured function values of neighboring points, and more particularly to methods and systems for multi-dimensional interpolation for color space conversion.

2. Description of Related Art

The need for multi-dimensional interpolation arises in many fields of signal and image processing, where it is required to determine the function value of a point in multi-dimensional space based on the known function values of a set of other points. A point with a known function value is usually called a "node". However, for simplicity, hereinafter, the terms "point" and "node" will be used interchangeably, and the term "known node" will be used to denote a point with a known function value. Traditionally, in many applications, the known nodes are conveniently selected to be at fixed uniformly spaced grid locations, and the known function values are obtained by measurements at these grid locations. It is well known that the interpolation accuracy of a non-linear space can significantly be increased when the locations of the same number of nodes are optimized for arbitrary locations that are not necessarily restricted to be on regular grid positions. However, the extra computational complexity that is needed to accommodate the arbitrary node locations typically prohibits the use of such scheme in practical applications.

Thus, there is a need for an interpolation method that would be easy to implement and that would provide more flexibility and better performance than the traditional method where the nodes are located at regular grid locations.

SUMMARY OF THE INVENTION

A method and a system for computing the function value of an input node based on function values of known nodes are disclosed. A database of known nodes and corresponding known node function values is formed. The known nodes are located such that a distance between any two adjacent known nodes is an integer power-of-two number. The database of known nodes is searched for a first node such that the input node is located between the first node and a second node adjacent to the first node, the first and second nodes having a first node function value and a second node function value, respectively. The difference δ between the input node and the first node is computed. Then δ is shifted to the right by k positions, k being the logarithm in base 2 of the distance between the first node and the second node. The function value of the input node is computed by combining the first node function value with the product of the shifted δ and the difference between the second node function value and the first node function value.

BRIEF DESCRIPTION OF THE DRAWINGS

The features and advantages of the present invention will become apparent from the following detailed description of the present invention in which.

DETAILED DESCRIPTION OF THE INVENTION

An efficient method of implementing interpolation or extrapolation operation in one or more dimensions is disclosed. Current techniques use a lookup table for the node function values followed by an interpolation stage, and generally require the nodes to be uniformly spaced. The method of the present invention allows the selected node positions in the lookup table to be programmable with the restriction that the (non-normalized) distance between adjacent nodes be an arbitrary integer power-of-two number. The new method requires very little additional computations over the existing techniques, and provides significantly better interpolation quality for the same number of nodes. The new method is simple, flexible, and invariant with respect to the hardware architecture. The new method has been implemented in software and has shown significant improvement in color fidelity for the application of color space conversion, compared to the traditional fixed-linear node spacing architecture.

In the application of SCC (scanner color space conversion), experimentation has shown that the method of the invention improves the color interpolation accuracy by a factor of almost 2 over the traditional methods (as measured by the color metric ΔE).

The method of the present invention reduces the additional complexity associated with the arbitrary node locations by restricting the (non-normalized) distance between adjacent nodes to be an integer power-of-two number. The new method is simple and easy to implement, and requires only the addition of a small lookup table for storing the node indices of the known nodes, the known nodes, and the inter-node exponents which are the base 2 logarithms of the distances between adjacent known nodes (see FIG. 5–FIG. 8, for examples).

The method is particularly applicable in the area of multi-dimensional interpolation for color space conversion. In the modern age of digital information, color documents are typically scanned in RGB and printed in CMYK. The data, therefore, must be converted from one color space to the other (e.g., from RGB to CMYK) as part of the printing process. It is well known that most CMYK printing processes are highly non-linear due to the properties of the marking devices and the complex multi-color toner or ink interaction.

For ease of clarity, the specific example of color space conversion will be used to illustrate the present invention. However, it is emphasized here that the present invention is general and applicable to many other fields including signal and image processing.

One method for dealing with the problem of color space conversion is to store in a table the preferred CMYK values that, when applied to a particular marking engine, would best reproduce a given RGB value. The content of the table could be determined by trial and error experimentation. Once such a table is constructed, it would be a simple matter to look up the desired CMYK values in real time. However, a table like this is highly non-practical, since there are millions of possible RGB colors, and the size of a full table would be excessive. For example, the usual representation of 8 bits per color RGB and CMYK, will require four tables (one for each of the CMYK colors) with each table containing $2^{24}$ bytes. This number will increase to $2^{30}$ bytes for a 10-bit RGB input. The cost of this much memory is prohibitive in practice.

The common approach to solving the memory size problem is to use a coarser 3-D table for the nodes, followed by a finer 3-D interpolation stage. Since the number of nodes (tylpically 9, 17, or 33, depending on the desire quality) is much smaller than the number of possible colors, the size of the table remains manageable. The table is used for looking up the desired CMYK values for the nodes nearest to the current RGB point. The interpolation stage is then used to calculate the (estimated) output CMYK values based on the CMYK values of the nearest nodes, under the assumption that the CMYK space is approximately piece-wise linear between adjacent nodes. The accuracy of approximation is dependent on the number of nodes, the relative positions of the nodes, and the non-linearity of the color transformation.

It is noted that several types of interpolation schemes have been proposed in the literature. A natural choice is the well-known multi-linear interpolation scheme, but there are other techniques, such as polyhedral interpolation schemes, which are much more efficient to implement. To illustrate the difference, consider the 3-D case mentioned above. In the tri-linear case, one would first identify the eight nearest nodes (best illustrated as the corners of a cube encompassing the given point of interest, see FIG. 1) and lookup their corresponding CMYK values in the table. The CMYK values would then be linearly interpolated (either directly or in a sequence of pairs) to determine an estimated value based of the fractional distance from the given point to each of the nodes. Alternatively, in the tetrahedral interpolation scheme, the cube is further divided into a number of tetrahedrons (a tetrahedron is defined here as the smallest-number-of-nodes object with a non-zero volume). The first step is to determine in which of the above tetrahedrons the given point is located. Then, only the CMYK values of the four nodes corresponding to the corners of this particular tetrahedron need to be looked up in the table (corresponding to half the bandwidth and number of table lookups relative to the tri-linear case). Finally, the CMYK values are linearly interpolated (either directly or in a sequence of pairs) to determine an estimated value based of the fractional distance from the given point to each of the tetrahedron corners. It is noted that the number of multipliers and adders needed for implementing the final interpolation phase is also much smaller than what is needed for the tri-linear case. Hence the tetrahedral method is much more efficient to implement than the tri-linear method, and can generally double the interpolation speed.

It is important to note that the method of the present invention is applicable to many types of interpolation schemes, including the tri-linear or tetrahedral methods described above.

It can be shown that, for any number of dimensions, the multi-dimensional interpolation stage by piecewise linear approximation can be reduced to a number of one-dimensional (1-D) interpolations in a cascading sequence.

Figure 1:
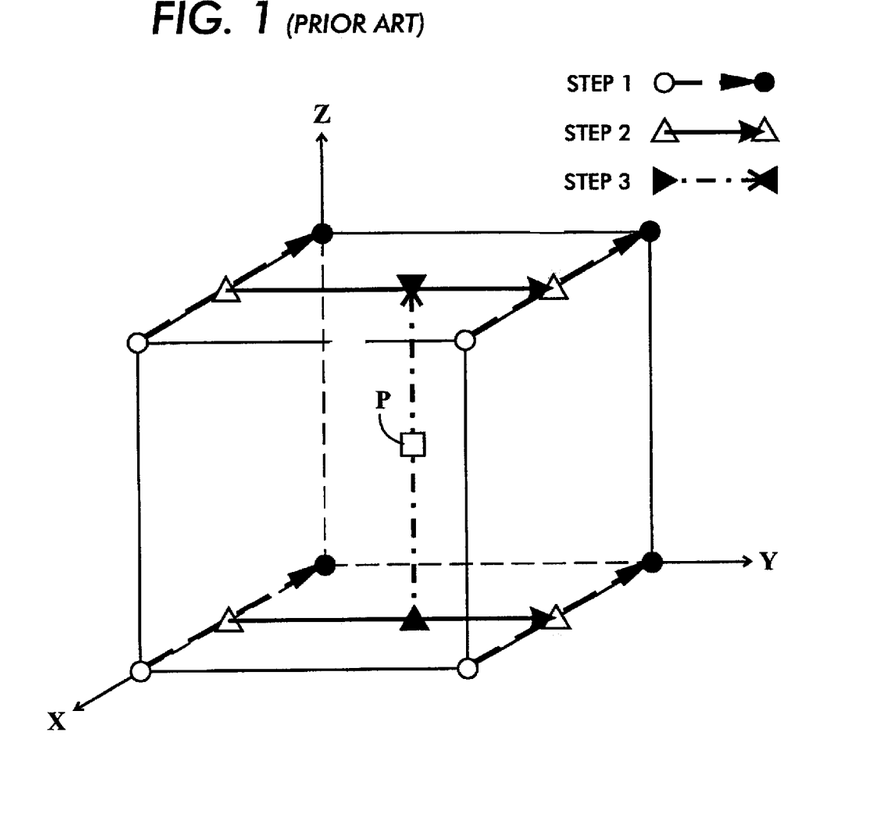
FIG. 1 illustrates the three steps of tri-linear interpolation.

FIG. 1 illustrates an exemplary sequence of three steps of tri-linear interpolation. For example, in the tri-linear case, the interpolation can proceed in pairs along one of the dimensions first, requiring four 1-D linear interpolations, as illustrated by Step 1 in FIG. 1. The resulting four values are then used in pairs along one other dimension, requiring two additional 1-D linear interpolations (Step 2). Finally, the resulting two values are then interpolated along the third dimension, requiring one more 1-D interpolation, to yield the final result (Step 3). Hence, the tri-linear interpolation requires a total of seven 1-D linear interpolators, implemented in a three-step sequence. As long as the multi-dimensional interpolation is co-linear, this result will hold true and the order of which dimension to use first will not affect the final result.

The generic method for interpolation described above, using lookup tables and 1-D linear interpolation, is, in fact, commonly used in practice since the color space non-linearity is often too complicated and cannot easily be described with a simple model. The traditional approach is to restrict the nodes in the lookup table to be measured on a fixed and uniform grid. While the assumption of equal distance between the nodes certainly simplifies the implementation, it is difficult to justify in practice. It would be desirable to allocate more nodes to those areas of the space that are more important visually, or where the degree of non-linearity is higher, that is, areas where the coarse piece-wise linear approximation accuracy would otherwise not be sufficient. The one advantage of the fixed-node scheme is that it is fairly easy to calculate the fractional distance to a base node, and the volume of a cube (in the tri-linear method) or a particular tetrahedron (in the tetrahedron method) is constant anywhere in the space.

The complexity of the conventional scheme, on the other hand, would increase significantly if the locations of the nodes could be selected in a fully arbitrary fashion. The added complexity comes from the fact that the distance between nodes may vary, and a multi-dimensional normalization operation, requiring divisions, would be needed to account for the different cube or tetrahedron sizes. It is well known that such divisions are costly to implement.

The method of the present invention allows the distance between nodes to be arbitrary, subject to the constraint that the integer non-normalized distance between any adjacent nodes is a binary power-of-two number. The motivation for this idea is that a division by an integer power-of-two number can be implemented as a simple shift operation. The additional constraint is not very restrictive since the binary power-of-two system is a logarithmic scale that is convenient for describing both small and large steps at the same time. Furthermore, the method retains full flexibility to choose the node positions to meet the desired reconstruction fidelity. The method typically requires a smaller number of nodes, compared to the uniform grid case for comparable accuracy. In addition, the simple implementation substantially reduces the associated cost (e.g., number silicon gates in ASIC design and computation complexity), relative to the fully arbitrary node position scheme.

The lookup table used in the conventional method contains the non-linear mapping from the input domain to the output domain. For the color space conversion application, the input domain could be, for example, RGB space, or a more device-independent intermediate space such as YCbCr space or CIE-Lab space (by CIE-Lab space, it is meant the 1976 updated version of the color model first introduced by Commission Internationale d'Eclairage in 1931), as is preferred in some applications, and the output domain is the device (marking engine) CMYK space. Since the nonlinear mapping function from device RGB to any of the above color spaces is either generally unknown or too complicated to implement in a straightforward manner, the content of the lookup table is usually determined by experimentation as part of the calibration process.

Figure 2:
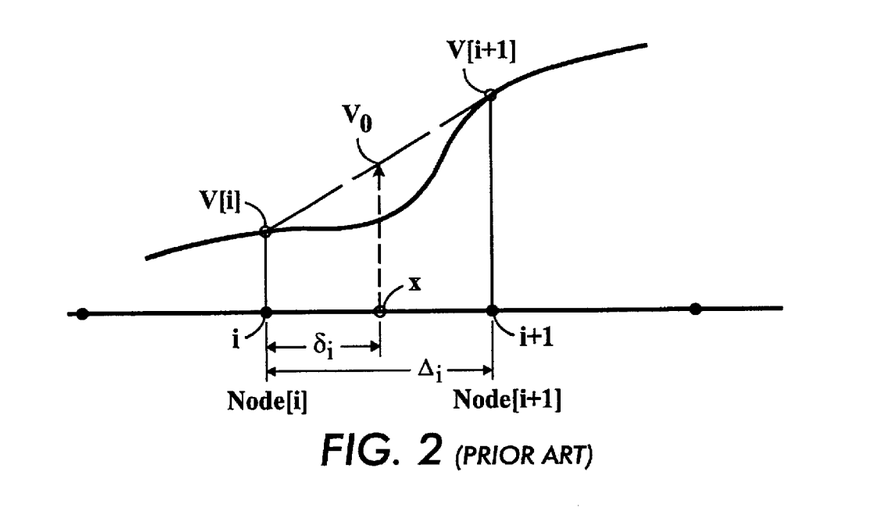
FIG. 2 illustrates an interpolation step in one dimension.

In general, given a lookup table, the basic 1-D interpolation step can be expressed as (see FIG. 2):

$$V_0 = V[i] + (\delta_i/\Delta_i)(V[i+1] - V[i]), \quad (1)$$

$$\delta_i = x - \text{node}[i], \quad (2)$$

$$\Delta_i = \text{node}[i+1] - \text{node}[i], \quad (3)$$

where x is the input point, $V[i+1]$ and $V[i]$ are the function values at nodes $\text{node}[i+1]$ and $\text{node}[i]$, respectively, i and i+1 are the node indices. $\delta_i$ is the distance from point x to the base node i, $\Delta_i$ is the distance between nodes i and i+1, and $V_0$ is the interpolated value at input point x. The implementation of Equation (1) involve the following three operations:

1) Base node search: this operation includes comparison logic to search for a "closest" base node $\text{node}[i]$, such that $\text{node}[i] < x < \text{node}[i+1]$; (note that, to ensure uniqueness of the solution, the node function value is generally assumed to be monotonous with the node index);
2) Fraction calculation: this operation calculates the normalized distance fraction $\delta_i/\Delta_i$, requiring a general division costly to implement in hardware;
3) Interpolation: one multiplication and two additions (a subtraction is counted as an addition) are needed to calculate the final interpolated value $V_0$.

In the conventional case of the simple fixed linear node spacing, the space between any two nodes is a constant, that is, $\Delta_i = \Delta = \text{constant} \, \forall i$. With constant spacing, the factor $\delta_i/\Delta$ is known and can be pre-calculated in advance as a normalizing factor. However, the equal spacing constraint fails to provide the flexibility to change the distribution of the nodes in the color space to achieve the highest quality, as discussed above. On the other hand, fully programmable node spacing provides the maximum flexibility but the implementation is costly and complicated due to the need to calculate arbitrary divisions as discussed above.

The present invention addresses both the flexibility (which implies higher quality) of the fully programmable node spacing method and the simplicity (which implies lower cost) of the fixed linear node spacing method discussed above. The present invention includes a programmable node architecture with power-of-two node spacing:

$$\Delta_i = \text{node}[i+1] - \text{node}[i] = 2^{k_i}, \, k_i \in N \quad (4)$$

where N is the set of natural numbers, and $k_i$ is a different integer constant for each pair of nodes. With the node spacing $\Delta_i$ expressed as a power-of-two number, the general division can be accomplished by a shift-right operation, which is simple to implement. That is, $$\delta_i/\Delta_i = \delta_i >> k_i. \quad (5)$$

Figure 3:
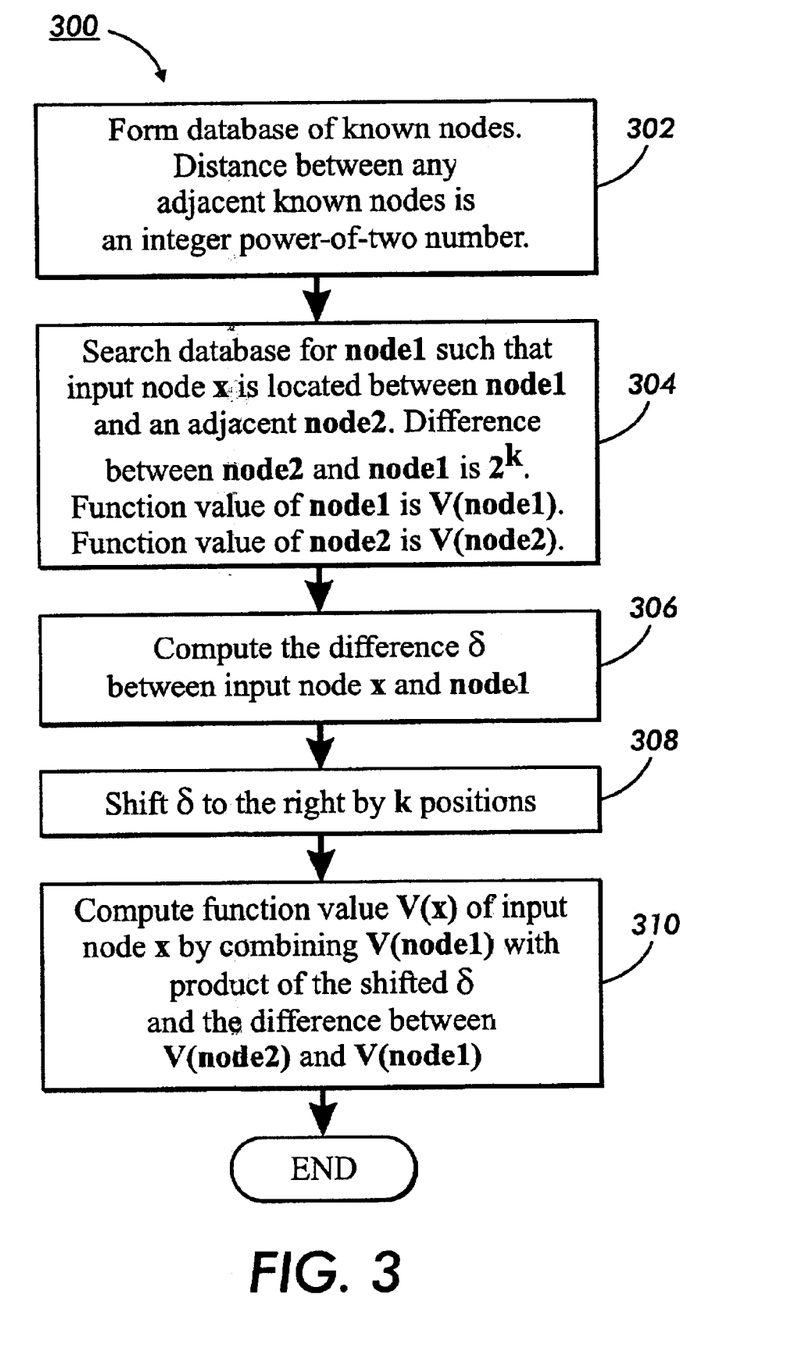
FIG. 3 is a flowchart of one embodiment of the process of the present invention.

FIG. 3 is a flowchart of an embodiment 300 of the process of the present invention. A database of the known nodes is formed. The known nodes are chosen such that the distance between any adjacent known nodes is an integer power-of-two number (block 302). For a given input node x, the database is searched for a base node node1 such that the input node x is located between node1 and an adjacent node2 (block 304). The difference between node2 and node1 is $2^k$. The function values of node1 and node2 are V(node1) and V(node2), respectively (stored in the database). Node1 is called a base node because the interpolation will start from the function value V(node1). The difference δ between input node x and node1 is computed (block 306). The value δ is logically shifted to the right by k positions, k being the logarithm in base 2 of the distance between the base node node1 and the second node node2 (block 308). The function value V(x) is computed by combining V(node1) with the product obtained by multiplying the shifted δ with the difference between V(node2) and V(node1) (block 310).

The selection of the base node is generally dependent on the origin of the input color space. For applications where the input color space has an origin at 0 (e.g., RGB color space with R, G, B ranging from 0 and 255), the base node is usually chosen to be less positive than the input node. In this case, V(node2)−V(node1) is positive. For applications where the origin of the input color space is not at 0, but somewhere in the middle range (e.g., CIE-Lab space or YCbCr color space with (a,b) or ($C_b$, $C_r$) ranging from −128 to +127), (see FIG. 7, for example), the base node is usually chosen to be less positive than the input node x if the input node x is greater than the origin, and more positive than the input node x if the input node x is smaller than the origin. In this case, V(node2) −V(node1) is positive for input node x greater than the origin, and negative for input node x smaller than the origin.

In most applications, the k values, also called inter-node exponents, may be computed in advance and stored in the database. In some applications, the k values may be computed in real time, when needed.

The following example shows how the database may be formed for an RGB to CMYK color space conversion application. First, a table of arbitrary RGB nodes and their corresponding preferred CMYK values is generated. The preferred CMYK values are the ones that would best reproduce the corresponding RGB values, when applied to a particular marking engine. The content of the table can be determined by trial and error experimentation, using high-precision instruments to measure actual color values of certain points on the output of the marking engine. After the table is generated, an interpolation scheme such as the tetrahedral method (discussed previously) can be used on the content of the table to obtain the CMYK values for a set of selected RBG points. These RGB points are selected such that the spacing between any two adjacent selected RGB points is an integer power-of-two number. The database is then formed by using only these selected RGB nodes and their corresponding CMYK values.

Figure 4:
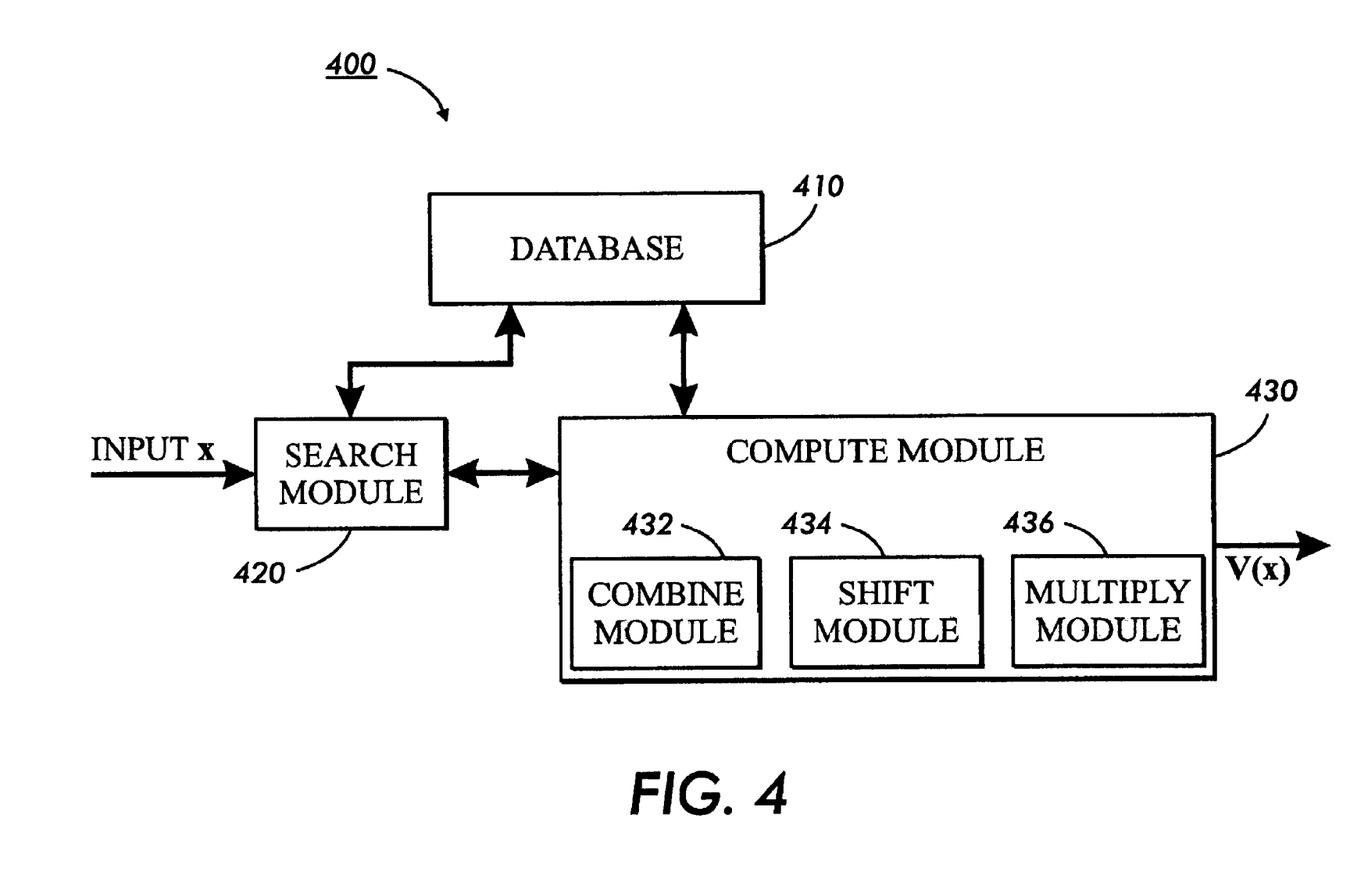
FIG. 4 is a block diagram of one embodiment of the system of the invention.

FIG. 4 is a block diagram of an embodiment 400 of the system of the present invention. System 400 comprises a database 410, a search module 420, and a compute module 430. The compute module 430 includes a combine module 432, a shift module 434, and a multiply module 436.

The database 410 stores a list of known nodes, corresponding known node function values, and inter-node exponents. The known nodes are located such that a distance between any two adjacent known nodes is an integer power-of-two number. Each of the known nodes that are not located at boundaries of the list is associated with two inter-node exponents which represent the logarithms in base 2 of respective distances between the corresponding known node with respective adjacent known nodes.

The search module 420 searches from the database for a base node such that the input node is located between the base node and a second node adjacent to the base node. The direction of search, whether above or below the input node, is programmable based on the location of the origin.

The combine module 432 computes the difference δ between the input node and the base node, and the difference ΔV between the second node function value and the base node function value. The shift module 434 shifts δ to the right by k positions, k being the inter-node exponent associated with the base node with respect to the second node. The multiply module 436 multiplies the shifted δ with the difference ΔV and outputs a product value. The combine module 432 combines the base node function value with the product value to form the function value V(x) of the input node.

The compute module 430 may communicate with the database, as shown in FIG. 4. This is the case where the search module 420 does not pass to the compute module 430 all data resulting from the search. For example, the search module 420 may pass only the node index of the base node. The compute module would use this node index to look up other data in the database 410. In another embodiment where the search module passes all needed data to the compute module 430, the compute module 430 does not need to access the database 410.

In a first embodiment, the database 410 includes a single lookup table that includes the node indices corresponding to the known nodes, the known nodes, the corresponding node function values, and the inter-node exponents.

In a second embodiment, the inter-node exponents are not stored in a lookup table, and are computed as needed.

In a third embodiment, the database 410 includes a main lookup table and an extra lookup table. The main lookup table includes the node indices corresponding to the known nodes, and the corresponding node function values. The extra lookup table includes the node indices corresponding to the known nodes, the known nodes, and the inter-node exponents.

The inter-node exponent is the base 2 logarithm of the distance between any two adjacent nodes:

$$\text{exponent }[i] = \log_2 (\text{node}[i+1] - \text{node}[i]) = k_i \quad (6)$$

This extra lookup table can be used in addition to the main lookup table associated with each of the dimension of the color space. The main lookup table looks like a traditional lookup table, i.e., it includes the node indices corresponding to the known nodes, and corresponding node function values. Note that a traditional lookup table only includes the node indices, not the node values, since the node spacing is a constant in traditional interpolation schemes. With this implementation (using a main lookup table and an extra lookup table), the search for the base node is performed on the extra lookup table first. The resulting base node index will be used to lookup the base node function value and the adjacent node function value in the main lookup table.

Figure 5:
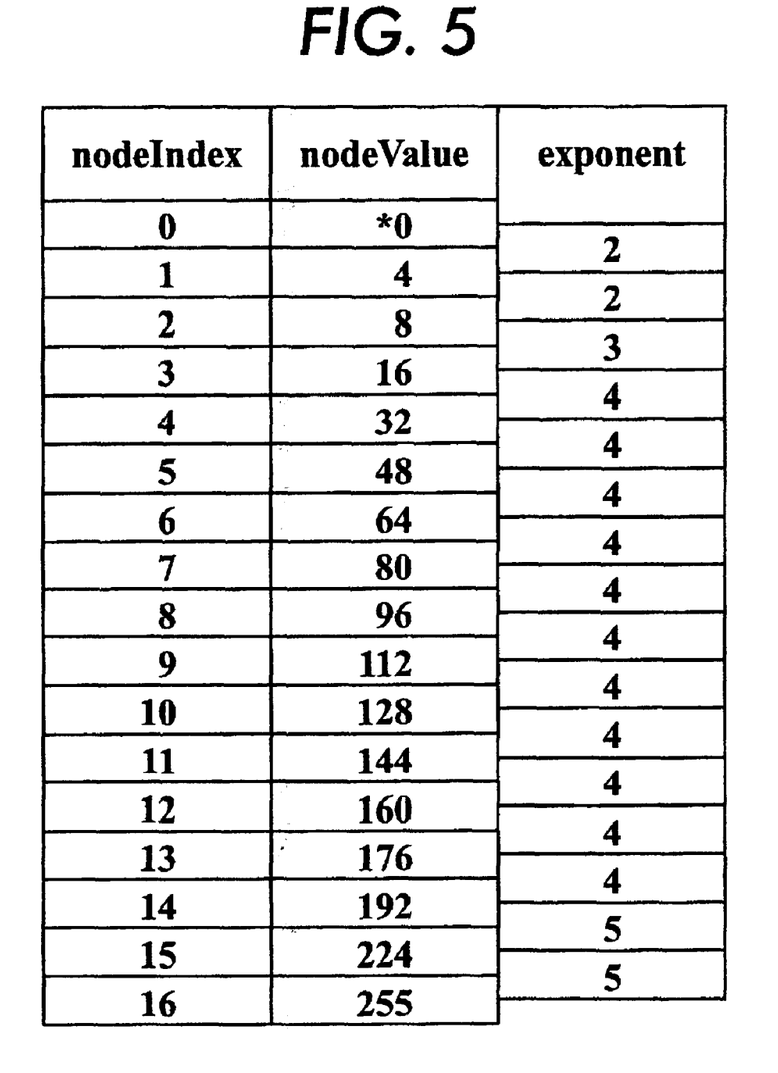
FIG. 5 illustrates an example of a small extra lookup table that may be used in the new architecture in conjunction with a main lookup table.

FIG. 5 illustrates an example of the small extra lookup table that may be used in the new architecture. The following exemplary pseudo code illustrates how the interpolated output $V_0$ may be computed for a given input x. The bisection algorithm used in the pseudo code is just one of many possible well-known search algorithms that could be used as a searching engine to find the base node.

x=$x_0$;
BaseNodeIndex=bisection(x);
BaseNode=Node(BaseNodeIndex);
δ=x−BaseNode;
k=exponent(BaseNodeIndex);
frac=δ>>k;
$V_0$=V[BaseNodeIndex]+frac*(V[BaseNodeIndex+1]−V[BaseNodeIndex]);

Theoretically, the architecture of the present invention can map any bit-precision input to any bit-precision output. Since the input and output are tabulated in the lookup table, any bit-precision representation can be accommodated in the table. In practice, the choice of bit-precision depends on the number of bits used for representing the signal (colors) and the cost to implement. The new architecture does not place any restrictions on the choice of bit-precision.

FIG. 5 gives an example of color space conversion in which denser samples are needed near the origin 0 (indicated with an asterisk in the nodeValue column). Note that the node spacing is closer for the nodes near the origin than those far from the origin. In FIG. 5, the node spacing goes from 4 near the origin, to 8 then 16 then 32 for nodes located far from the origin. This type of node distribution has been found to be desirable when working with the RGB input color space (where a square root rule is often used in practice). The rows in the "exponent" column of FIG. 5 are not aligned with the rows in the nodeIndex and nodeValue columns, to illustrate that each node, not located at the boundaries of the lookup table, is associated with two inter-node exponents. For example, the node having index 2 and value 8 is associated with inter-node exponent 2 with respect to adjacent node having index 1 and value 4, and with inter-node exponent 3 with respect to node having index 3 and value 16. It is noted that nodeValue denotes the node itself, not the function value of the node (the function values of the nodes are stored in the main lookup table, not in this extra lookup table). FIG. 5 is used for input nodes that are expressed as 8-bit numbers.

Figure 6:
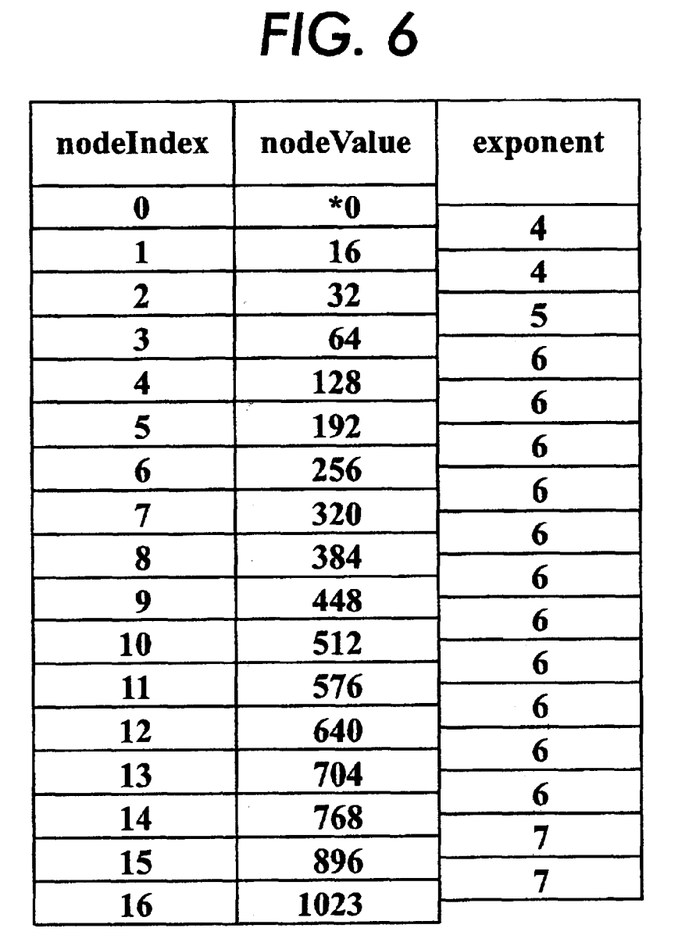
FIG. 6 gives an exemplary lookup table that takes 10-bit input instead of the 8-bit input shown in FIG. 5.

FIG. 6 gives an example of an extra lookup table that takes 10-bit input instead of the 8-bit input as shown in FIG. 5. In FIG. 6, the origin is also at 0.

Occasionally, the system needs to support different input color spaces, for example, CIE (L,a,b), Fax (L,a,b), etc. For CIE (L,a,b), the a and b channels have origin at 128. However, for Fax (L,a,b), the a channel has origin at 128 but the b channel has origin at 96. The new architecture is very flexible and can easily support the various origin differences and needs of the different input color spaces without having to change the implementation. Hence, the architecture is implementation invariant and generic. Using different lookup tables will serve the needs of different requirements.

Figure 7:
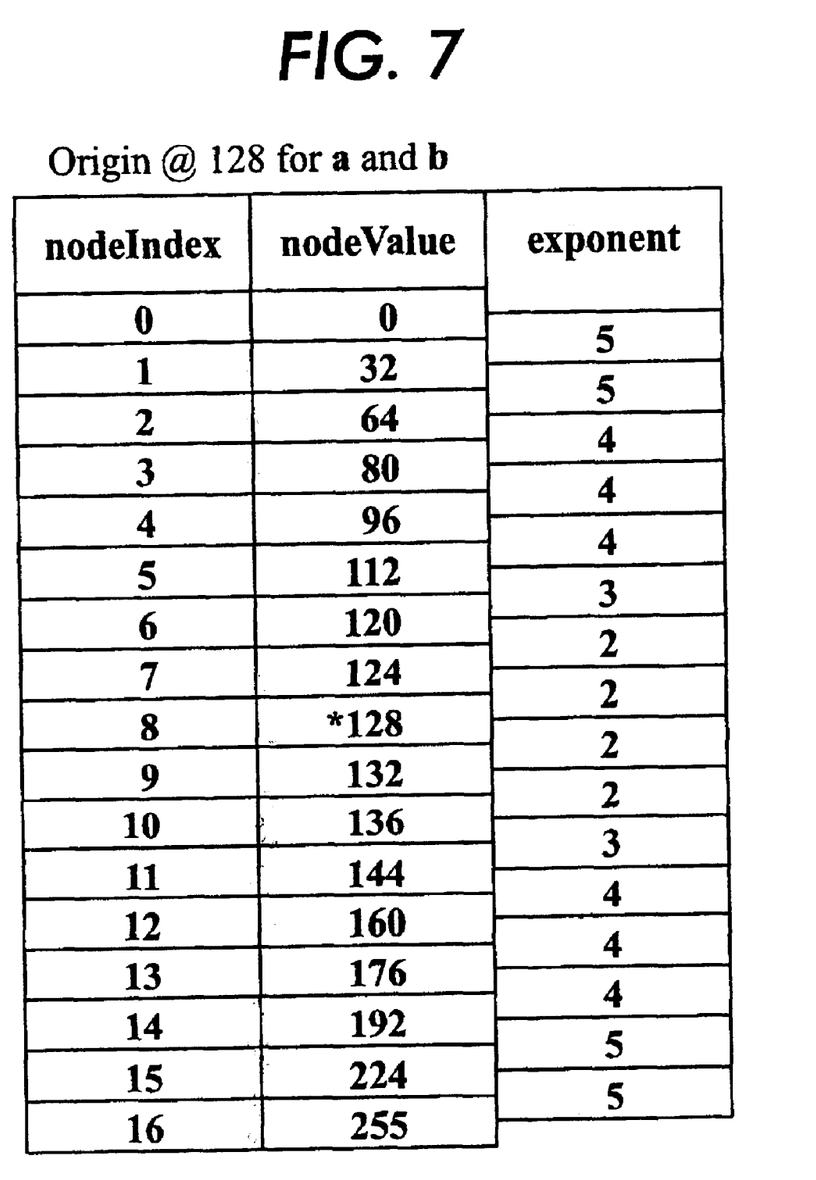
FIG. 7 shows an exemplary lookup table for signals having origin at 128.
Figure 8:
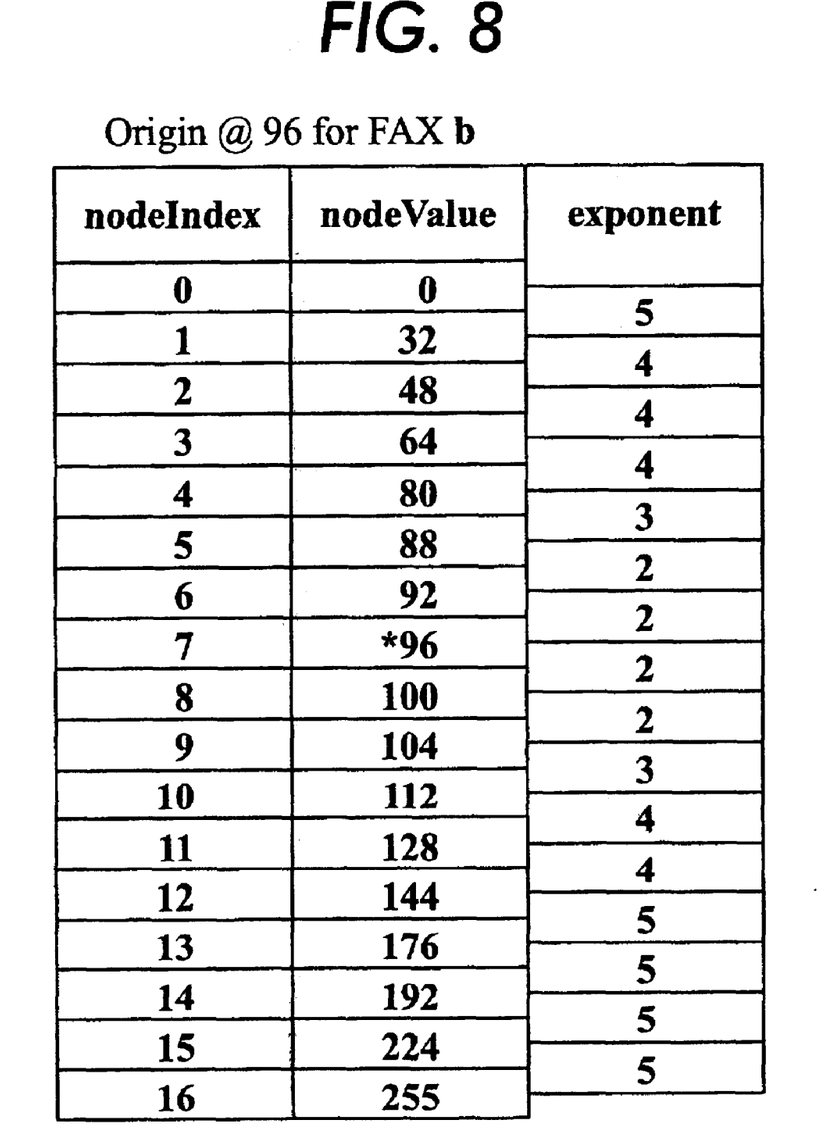
FIG. 8 shows an exemplary lookup table for signals having origin at 96.

FIG. 7 and FIG. 8 show examples of extra lookup tables for signals having origins at 128 and 96, respectively. The table shown in FIG. 7 is used for both the a and b channels for CIE (L,a,b) space, and for the a channel for Fax (L,a,b) space. The table shown in FIG. 8 is used for the b channel for Fax (L,a,b) space. For Fax (L,a,b) space, the lookup table may be loaded with the table shown in FIG. 7 for the a channel, then reloaded with the table shown in FIG. 8 to accommodate the b channel.

The new method was tested in a Scanner Color Conversion application in which the scanner RGB input was converted to CIE (L,a,b) color output. The standard ITU-8 chart was used as a calibration target. In order to compare the performance of the power-of-two node spacing method of the present invention with the performance of the traditional fixed linear node spacing method, a reference implementation having non-linear node spacing with twice the number of nodes (to provide denser interpolation) was used as the benchmark. The conversion accuracy was measured in terms of the color difference signal ΔE between the output CIE Lab values obtained with each of the two methods (traditional method and present invention) and the output CIE Lab values obtained by the benchmark.

In both of the traditional fixed linear node spacing method and the new power-of-two node spacing method, 17×17×17 lookup tables and tetrahedral interpolation were used, under the same number of nodes. For the reference implementation with much denser interpolation, a 32×32×32 lookup table with nonlinear cube-root node spacing was used. The node locations for the first two methods are shown below:

| | | | | | | | | | | | | | | | | | |
|---|---|---|---|---|---|---|---|---|---|---|---|---|---|---|---|---|---|
| Linear: | 0 | 16 | 32 | 48 | 64 | 80 | 96 | 112 | 128 | 144 | 160 | 176 | 192 | 208 | 224 | 240 | 255 |
| Power-of-two: | 0 | 4 | 8 | 16 | 32 | 48 | 64 | 80 | 96 | 112 | 128 | 144 | 160 | 176 | 192 | 224 | 255 |

The average ΔE obtained for linear node spacing and for power-of-two node spacing were 2.67 and 1.53, respectively. This experiment shows that the new power-of-two architecture provides much more accurate conversion than the fixed linear node spacing architecture, and with a small amount of extra computations. This experiment shows that, in the application of scanner color space conversion, the method of the present invention improves the color fidelity by almost factor of 2 over the traditional method. Thus, the new power-of-two node spacing architecture provides a good tradeoff between the flexibility and complexity. Unlike the fixed linear node spacing architecture, the architecture of the present invention retains the flexibility to choose non-linear node spacing to better meet the image quality requirements, and on the other hand, unlike the fully programmable node architecture, the new architecture is simple and cost effective to implement.

While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for computing a function value of an input node based on function values of known nodes, the method comprising the operations of:
  (a) forming a database of known nodes and corresponding known node function values, the known nodes being located such that a distance between any two adjacent known nodes is an integer power-of-two number;
  (b) searching from the database of known nodes for a first node such that the input node is located between the first node and a second node adjacent to the first node, the first and second nodes having a first node function value and a second node function value, respectively;
  (c) computing a difference δ between the input node and the first node;
  (d) shifting δ to the right by k positions, k being the logarithm in base 2 of the distance between the first node and the second node; and
  (e) computing the function value of the input node by combining the first node function value with a product of the shifted δ and the difference between the second node function value and the first node function value.

2. The method of claim 1 wherein operation (a) comprises the operations of:
  generating a first lookup table and a second lookup table, the first lookup table including node indices corresponding to the known nodes, and corresponding node function values, the second lookup table including node indices corresponding to the known nodes, the known nodes, and inter-node exponents, each of the known nodes not located at boundaries of the second lockup table being associated with two inter-node exponents which represent the logarithms in base 2 of respective distances between the corresponding known node with respective adjacent known nodes; and
  loading the first and second lookup tables into the database.

3. The method of claim 2 wherein the known nodes correspond to a dimension of a first multi-dimensional space, and the node function values in the first lookup table correspond to a dimension of a second multi-dimensional space.

4. The method of claim 3 wherein the first multi-dimensional space has an origin, and wherein, in operation (b), the direction of search for the first node with respect to the input node depends on the location of the origin.

5. The method of claim 1 wherein, in operation (b), the direction of search for the first node with respect to the input node is programmable.

6. The method of claim 1 wherein operation (a) comprises the operations of:
  generating a lookup table, the lockup table including node indices corresponding to the known nodes, the known nodes, corresponding node function values, and inter-node exponents, each of the known nodes not located at boundaries of the lookup table being associated with two inter-node exponents which represent the logarithms in base 2 of respective distances between the corresponding known node with respective adjacent known nodes; and
  loading the lockup table into the database.

7. The method of claim 1 wherein operation (a) comprises the operation of programming locations of the known nodes.

8. The method of claim 1 wherein operation (d) comprises the operation of computing the logarithm in base 2 of the distance between the first node and the second node to obtain k.

9. A system for computing a function value of an input node based on function values of known nodes, the system comprising:
  a database storing a list of known nodes, corresponding known node function values, and inter-node exponents, the known nodes being located such that a distance between any two adjacent known nodes is an integer power-of-two number, each of the known nodes not located at boundaries of the list being associated with two inter-node exponents which represent the logarithms in base 2 of respective distances between the corresponding known node with respective adjacent known nodes;

a search module searching from the database for a first node such that the input node is located between the first node and a second node adjacent to the first node, the first and second nodes having a first node function value and a second node function value, respectively; and a compute module, in communication with the search module, comprising:

a combine module computing a difference $\delta$ between the input node and the first node, and the difference $\Delta V$ between the second node function value and the first node function value;

a shift module shifting $\delta$ to the right by k positions, k being the inter-node exponent associated with the first node with respect to the second node; and a multiply module multiplying the shifted $\delta$ with the difference $\Delta V$ and outputting a product value;

wherein the combine module combines the first node function value with the product value to form the function value of the input node.

10. The system of claim 9 wherein the database includes a first and a second lookup tables, the first lookup table including node indices corresponding to the known nodes, and the corresponding known node function values, the second lookup table including the node indices, the known nodes, and the inter-node exponents.

11. The system of claim 9 wherein the known nodes correspond to a dimension of a first multi-dimensional space and the corresponding known node function values correspond to a dimension of a second multi-dimensional space.

12. The system of claim 11 wherein the first multi-dimensional space has an origin, and wherein the search module searches for the first node in a direction, with respect to the input node, that depends on the location of the origin.

13. The system of claim 9 wherein the search module searches for the first node in a programmable direction with respect to the input node.

14. The system of claim 9 wherein the database comprises a lookup table, the lookup table including node indices corresponding to the known nodes, the known nodes, the corresponding node function values, and the inter-node exponents.

15. The system of claim 9 wherein locations of the known nodes in the database are programmable.

16. The system of claim 9 wherein the system is implemented on an integrated circuit.

17. A database of known nodes having corresponding known nodes function values, the database comprising:

a first lookup table including node indices corresponding to the known nodes, and the corresponding known node function values, the known nodes being located such that a distance between any two adjacent known nodes is an integer power-of-two number; and a second lockup table including the node indices, the known nodes, and the inter-node exponents, each of the known nodes not located at boundaries of the second lookup table being associated with two inter-node exponents which represent the logarithms in base 2 of respective distances between the corresponding known node with respective adjacent known nodes.

18. The database of claim 17 wherein locations of the known nodes are programmable.

19. The database of claim 17 wherein locations of the known nodes are programmed such that a node spacing for known nodes located near the origin is smaller than a node spacing for known nodes located farther from the origin.

* * * * *